United States Patent [19]

Daubon

[11] Patent Number: 4,513,955
[45] Date of Patent: Apr. 30, 1985

[54] LEVEL CLAMP APPARATUS

[76] Inventor: Charles E. Daubon, 2271 S. 11th St., Milwaukee, Wis. 53215

[21] Appl. No.: 460,304

[22] Filed: Jan. 24, 1983

[51] Int. Cl.³ ............................................. B23Q 1/04
[52] U.S. Cl. ...................................... 269/41; 269/43; 269/155; 269/282
[58] Field of Search ................. 228/49 B, 49 C, 49 R; 269/37, 41, 43, 49, 279–284, 902, 246, 155; 29/271, 272

[56] References Cited

U.S. PATENT DOCUMENTS

| 2,438,541 | 3/1948 | Crook | 269/41 |
| 3,182,988 | 5/1965 | Woodall | 269/37 |
| 3,556,508 | 1/1971 | Varga | 269/37 |
| 4,363,475 | 12/1982 | McCarty | 269/283 |

FOREIGN PATENT DOCUMENTS 1046250 2/1976 Canada ................... 29/271

Primary Examiner—Robert C. Watson
Attorney, Agent, or Firm—Andrus, Sceales, Starke & Sawall

[57] ABSTRACT

An alignment level tool aligns and holds metal plate edges in alignment for welding. The tool includes an L-shaped member and a series of work adaptor members. One arm of the L-shaped member has working screw threaded therein and the other arm has a mounting plate. The adaptor members include an L-shaped adaptor bracket, and a special V-shaped adaptor bracket. The L-shaped bracket has a short leg and a relatively long leg with each leg having an opening for bolting to the mounting plate of the L-shaped member. The bracket legs provide a two point support on a curved work plate or an offset planar support for an angulated plate. The adaptor bracket is temporarily welded to one work plate. The screw is aligned with the second work plate and is actuated to positively force the work plates into alignment for welding. The tool is then removed by bending with respect to the bracket weld to break the weld. A pair of opposed end-to-end pipe members or similar circular members are aligned by attaching a bracket having a mounting plate for attachment to the arm mounting plate and a V-shaped member attached to the bracket plate. The outer edges of the V-shaped member engage the pipe and one side is temporarily welded to the pipe. The L-shaped member aligns the screw in overlying alignment with the other pipe. The multiple part level tool including separate specially shaped adaptor and the common L-shaped member having the common mounting provides a versatile tool for aligning work pieces.

7 Claims, 6 Drawing Figures

U.S. Patent  Apr. 30, 1985  4,513,955
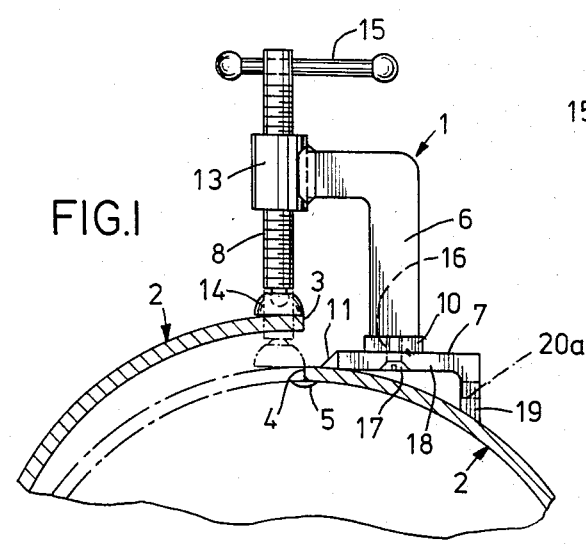
FIG. 1
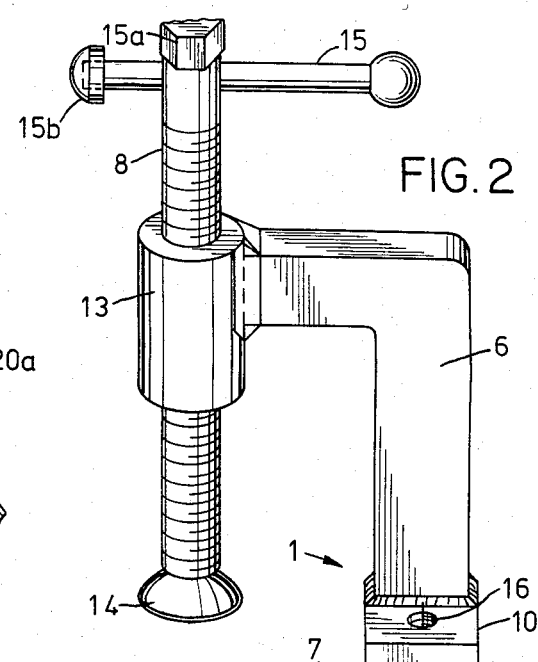
FIG. 2
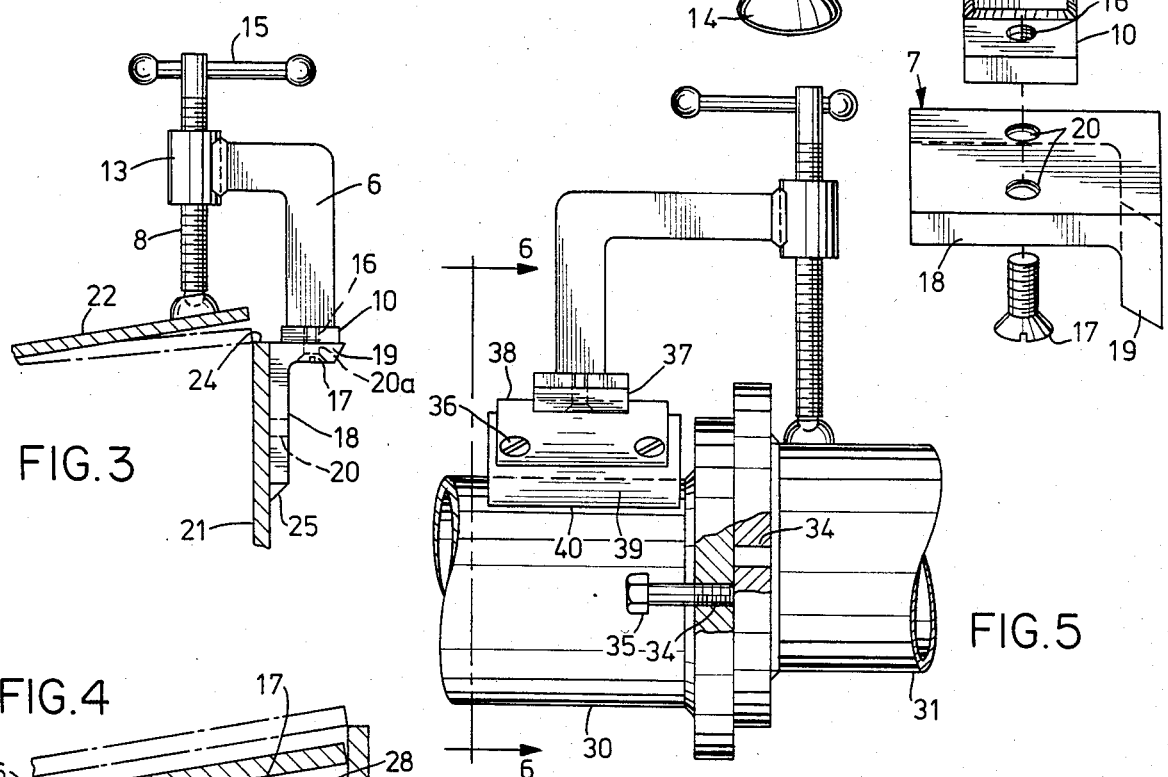
FIG. 3
FIG. 5
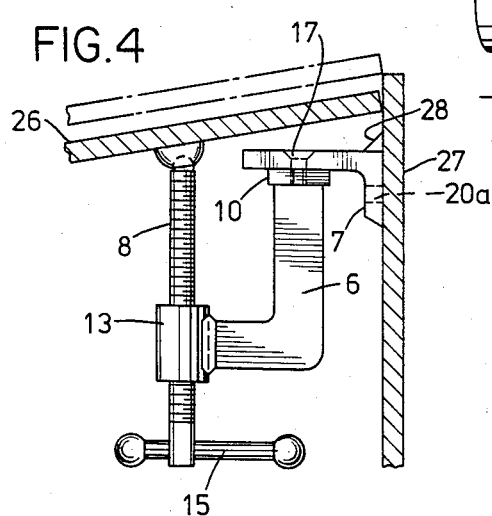
FIG. 4
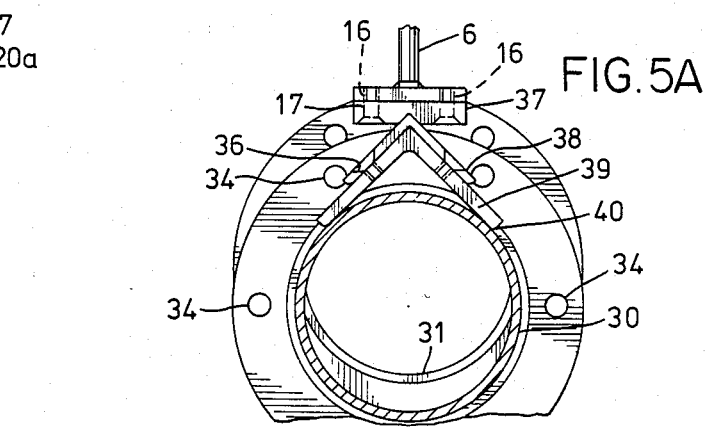
FIG. 5A

LEVEL CLAMP APPARATUS

BACKGROUND OF THE PRESENT INVENTION

The present invention relates to a level clamp apparatus for leveling of opposed work members and particularly to such a clamp apparatus for holding of a pair of opposed offset members with the opposed edges in alignment for welding and the like.

In welding and the like, opposed edges of work metal elements are supported in touching or slightly spaced relation and joined by heating the edges to fusion such as by arc welding or the like. Various applications are encountered where the edges are not aligned and means must be provided to deflect one or both of the members to align the edges in order to properly weld the edges to each other.

Various clamp devices have been suggested for such as conventional C-clamps and the like for clamping of the edges of opposed plates in alignment with each other. For example, U.S. Pat. No. 3,556,508 illustrates a clamp with a flat plate and an adjustment screw. The flat plate is welded to the work and a screw moves to align the work edges. A particularly satisfactory system is a tool sold by Enerpac, Inc., Model No. FYF-1. Such tool includes an elongated base, one end of which is adapted to be releasably secured and abut one of the plate members. The tool base includes a horizontal supporting recess adapted to releasably engage a flanged member secured to the first plate as by welding. The opposite end of the tool base extends over the opposite plate and includes a hydraulic actuator for forcing of the opposed plate into alignment with the first plate. A mechanical screw lock is provided to hold the plates in the aligned position during welding. After welding of the edges, the tool is removed and the flanged support member removed as with a hammer or the like. Such mechanical tools provide a rapid means of aligning the plates which minimizes the operator's time, minimizing cost of manufacture.

Although various clamp means are available to align the edges for plate members as well as specialized tools for other particular applications, a need remains for a highly versatile tool which permits alignment of the edges and the like in many different applications, such as pipe members angulated flat plates in different orientations and the like. For example, a cylindrical member is often formed from a plate-like member which is bent into a circular configuration, and the opposed edges are welded to provide a longitudinal seam. The circular configuration requires special tooling or supports to adequately hold the opposed plates with the edges aligned. Other applications may involve flat plates which are mounted essentially at right angles, or some intermediate angle, to each other and require the moving or bending of one or the other of the plates to affect the desired alignment for welding. Although special fixtures may be provided for any given application, the construction of the fixtures is time consuming and construction on a case-by-case demand significantly increases the operator cost and consequently the product cost. There is therefore a need for a versatile single aligning and clamping level tool which can be applied to the various plate-like work members encountered in actual practice. The level tool should of course provide for convenient mounting and rapid manipulation in order to minimize operator time and cost.

SUMMARY OF THE PRESENT INVENTION

The present invention is particularly directed to an alignment level tool for aligning and holding a pair of offset metal edges in accurate alignment for welding or other edge working. Generally in accordance with the present invention, a generally D-shaped level tool unit is provided including an L-shaped member and a work adaptor member. The L-shaped member includes a linear actuator element in the end of one arm and a releasable mounting or attachment means at the end of the opposite arm. The actuating member is movable normal to the plane of the mounting means. The mounting means is adapted to receive an adaptor member which is specially adapted to the work application and having a complementing mounting means. Generally, a universal adaptor is an L-shaped bracket which is preferably formed with different leg lengths to provide a relatively short leg and a relatively longer leg. The L-shaped bracket is constructed for releasable attachment of either leg to the clamp mounting means which is preferably a base block or plate. In application, the L-shaped bracket is releasably secured to the base block or plate of the L-shaped arm, as by attachment bolt means, with the bracket legs located to provide a two point support on a curved surface or an offset planar support for an angulated plate, with the actuating member overlying the second opposed member. The bracket is edge welded or otherwise temporarily affixed to the abutting plate member. The actuating element in the opposite arm of the L-shaped member is actuated and positively force the offset plate into alignment with the first plate. The edges may then be properly welded together or otherwise worked as required. After completing the weld, the tool is readily removed by grasping of the L-shaped member and bending thereof with respect to the bracket weld to break the weld. If necessary, the operator can of course remove the spot weld from the plate.

The tool of course permits ready application to a curved plate or to angled flat plates.

The multiple component level tool is adapted to other work, such as a pair of opposed end-to-end pipe members by an appropriate adaptor. Thus, the bracket may include a V-shaped member secured to a mounting plate adapted to be releasably coupled to the base plate to provide a pair of longitudinal edges which can abut the spaced longitudinal lines on the pipe. The V-shaped member is temporarily spot-welded or otherwise affixed to the one pipe along one edge, with the L-shaped member located to align the actuating element in overlying alignment with the opposed pipe. Once welded or otherwise interconnected, the actuating element is released and the level tool readily removed by breaking of the bracket weld, as by pulling and bending the tool and/or otherwise breaking of the interconnecting weld.

The multiple part level tool including an L-shaped member and a separate mounting bracket provides a highly versatile tool particularly adapted to aligning work pieces for welding or other working. The present invention thus provides a level tool and method including the special adaptor bracket particularly adapted to the shape and configuration of the reference work member. The present invention in particular provides a relatively simple and inexpensive tool and method particularly adapted for arc welding or the like.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a side elevational view of an aligning or level tool constructed in accordance with the present invention and applied to the opposite edge portions of a curved plate to hold the edges aligned during formation of a longitudinal weld;

FIG. 2 is an exploded view of the tool and work shown in FIG. 1;

FIG. 3 is a view similar to FIG. 1 illustrating the tool applied to a pair of plate members mounted at essentially 90 degrees to each other and where the plates are accessible from the exterior or outer side of the two intersecting plates;

FIG. 4 is a view similar to FIG. 3 showing angulated flat plates with one plate to be moved outwardly into alignment with the opposed edge of the adjacent plate; and FIG. 5 is a view showing the tool with a modified mounting base for aligning a pair of opposed pipe members.

FIG. 5a is a side view of the tool and work shown in FIG. 5.

DESCRIPTION OF THE ILLUSTRATED EMBODIMENT

Referring to the drawings and particularly to FIG. 1, an aligning level tool 1, constructed in accordance with the teaching of the present invention, is shown applied to formation of a cylindrical member 2, of which only the opposed edge portions are shown from a single metal plate which is bent into a generally cylindrical configuration. The plate 2 has the opposed edge portions which in the bending may be offset as shown in FIG. 1. The edge portions must be deflected to align the edges 3 and 4 and to permit interconnection to each other as by a weld 5, as shown in phantom. Thus, with such edge alignment, the edges 3 and 4 can be readily joined by any suitable welding means such as arc welding, resistance welding or the like. The illustrated level tool 1 is particularly adapted to deflect one of the plate portions 2 relative to the other and thereby provide the desired alignment.

In the illustrated embodiment of the invention, the tool 1 is connected to the inner deflected portion 2 and coupled to the outer portion 2 for deflecting thereof inwardly to provide the desired edge alignment as shown in phantom in FIG. 1. In accordance with the teaching of the present invention, the alignment level tool 1 includes a generally L-shaped member 6 and a separate mounting adaptor bracket 7. An adjustable working element 8, shown as a screw member, is movably mounted within the outer end of the one leg of the L-shaped member 6. A mounting base 10 is formed on the end of the opposite leg of the L-shaped member 6. The base 10 is adapted to be secured to the one work plate member or to releasably receive the adaptor bracket 7. The bracket 7, as illustrated in FIG. 1, is adapted to have one edge temporarily welded to the reference plate 2 as by a weld 11 to thereby mount the tool 1 in position with the opposite arm or leg of the L-shaped member overlying and in alignment with the opposite edge portion 3. The working element 8 moves inwardly to positively force the outer deflected plate portion inwardly toward the inner plate portion to thereby align the opposed edges 3–4. The edges are thus held in relatively precise alignment for suitable welding. After welding, the working member 8 is retracted, or can even be left in place if it will not interfere with the tool removal. The operator grasps the L-shaped member 6 and pulls on the unit causing it to bend about the temporary weld 11. This weld 11 breaks and permits the convenient removal of the tool. Generally, the weld can be readily broken by the operator merely twisting the tool. If not, any suitable auxiliary tool which is readily available to a welding operator can be applied to break the weld 3 and to permit removal of the tool.

More particularly in the embodiment of the invention shown in FIGS. 1–3, the L-shaped member 6 may be any suitable high strength material, such as a high strength steel, aluminum or iron, including cast steel and the like presently used in the formation of C-clamps and the like. The one end of the L-shaped member 6 is formed with a tubular boss 13 having its axis parallel to the other leg and having internal threads and has a sufficient length to be moved inwardly beyond the plane of the mounting block or plate 10. The threaded screw 8 threads through the tubular boss 13. The inner end of the screw 13 is formed with a conventional flat face 14, which may be integrally formed on the screw or provided with a separate member attached by a universal swivel connection. The outer end of the screw 8 is provided with a cross-opening for receiving actuating handle 15 to permit high rotational force movement of the screw with the usual mechanical advantage provided by the threaded connection. In addition to the handle 15, the outer end of the screw 8 may be provided with a standard bolt Hex head 15a to receive a wrench including an impact wrench. The head 15a may be formed directly on the screw or a nut member separately welded. The handle 15 is then preferably made removable, as by having one of the ends formed with a lock nut 15b. Although not shown, the working screw or other working element may be located within a protective housing. This may be desirable to protect the screw member from welding flash and other contamination.

The mounting base 10 is shown as a separate flat metal plate integrally formed with the L-shaped member or separately formed and affixed as by welding or the like. The plate 10 extends laterally of the L-shaped arm 6 and is provided with suitable threaded openings 16, one to each side of the member 6. The adaptor bracket 7 is adapted to be secured to the plate 10 abutting the underside thereof by suitable locking screws 17.

The adaptor bracket 7 is shown as a right angle metal channel having flat leg members 18 and 19, preferably formed with flat surfaces and of different lengths. The L-shaped channel has a width essentially corresponding to the width of the mounting plate 10 and each of the legs 18 and 19 have a length greater than that of the mounting plate 10. The long leg 18 is formed with laterally spaced openings 20 for alignment with the threaded openings 16. Coupling screws 17 pass through the openings 20 and thread into the base threaded opening 16. Recessed screws are advantageously used to maintain a smooth exterior surface. This is particularly desirable where the device is applied to a curved member to ensure that a protruding screw head will not interfere with the interconnection to the adjacent work plate or member 2. Further, the opening 16 may receive a clamping bolt nut assembly and the opening 16 may be unthreaded so that a bolt and nut or other similar rod-like clamp is only used.

The opposite shorter leg of the bracket 7 is provided with similar openings 20a to permit interconnection of the short leg to the mounting base plate as more fully described hereinafter.

In assembly and use of the tool 1, the bracket 7 is suitably welded to the reference plate 2 as by the weld 3. Thus, the adaptor is formed of a metal compatible with the work member to be aligned so as to permit the welding. For example, the adaptor bracket may be formed of steel, high strength aluminum and like materials which are encountered in shop and production welding. The tool 1 is oriented with the end of the operating screw 8 located in overlying relation to the deflected plate 2. The screw is turned inwardly thereby mechanically deflecting the plate inwardly until its edge 3 is in alignment with the edge 4 of the referenced plate. At that time, the weld 5 of plates 2 is completed. Thereafter, the screw 8 is retracted, permitting the operator to bend the tool 1 about the bracket weld point 3. Generally such movement of the tool breaks the weld for release of the tool. The special bracket 7 is readily reusable for subsequent application.

In the illustrated embodiment of the invention, the L-shaped adaptor bracket 7 with the mounting means provided in each leg is readily used in other orientation such as the inside pipe.

For example, if the exterior pipe surfaces are not accessible, the tool can be attached to the inner surface of the outwardly deflected plate, shown in FIG. 1, with the working member 8 aligned with the interior surface of the inner deflected plate 2. Thus, the mounting 10 is generally to the center of the leg and the adaptor can be rotated to locate the outer leg 19 inwardly of the mounting arm 6 but also inwardly of screw 8 to accommodate the internal curvature of a pipe. Operation of the tool deflects the inwardly deflected plate outwardly until the desired edge alignment is achieved.

Further, if the members 2 are flat rather than curved members and are angularly oriented with respect to each other, the L-shaped mounting bracket 7 can be readily attached with the legs abutting the angled plate to appropriately align the working screw with the opposed member.

Thus, the same tool can be applied to other welding applications, such as a pair of welding plates oriented at a right angle 45 degrees or some other angle to each other and with some misalignment. For example, a pair of plates 21 and 21 are shown in 90 degree orientation as shown in FIG. 3.

In FIG. 3, a vertical work plate 21 is illustrated shown in fixed relationship to a horizontal plate 22. The upper edges 23 and 24 are to be interconnected. The horizontal plate 22, however, is slightly offset and thus not in alignment with the upper edge 24 of the vertical plate 21. The horizontal plate is to be deflected downwardly into appropriate alignment before a proper weld can be created.

The clamping or alignment tool 1 of FIGS. 1-3 is reoriented and coupled to the vertical plate 21 as shown in FIG. 3 to permit convenient and ready alignment of the edges for welding. In this instance, the L-shaped bracket 7 is attached with the relatively short leg 19 affixed to the mounting base 10, as by suitable clamping screws 17 passing through opening 20a. The bracket 7 is oriented with the second or longer leg 18 located inwardly of the L-shaped member 6 and extending parallel outwardly thereof to form an offset extension.

The depending extension leg 18 abutts the vertical plate 21. The outer end of the leg 18 is welded to the vertical plate, as at 25. This locates the alignment level tool 1 with the work screw 8 aligned with and overlying the deflected horizontal plate 22. Appropriate rotation of the screw 8 results in the appropriate inward movement thereof and correspondingly deflection of the engaged plate to produce the desired edgewise alignment of the two plate edges 23-24. After welding the operator merely grasps the tool 1 and pivots the tool about the temporary weld 25 and breaking such weld for removal of the tool from the working members.

As noted previously, if plate 21 were at some other angle such as 45 degrees, the adaptor bracket 7 may be attached with the legs engaging the plate to compensate for such angular orientation.

A similar deflection from the interior of 90 degrees angulated oriented offset plates 26 and 27 can also be provided by reorientation of the tool, such as shown in FIG. 4. The horizontal plate 26 is deflected inwardly of the vertical plate 27. In this embodiment of the invention, the L-shaped bracket 10 is secured to the outer mounting plate 10 of the L-shaped arm. In this instance, the interconnection is such that the opposite leg of the mounting channel bracket 7 extends upwardly immediately outwardly and parallel with the leg. The tool 1 is welded to the inner plate as at 28 with the outer end of the bracket attached to the inner side of vertical plate 27 immediately inwardly of the generally horizontal plate 26. The screw member 8 is actuated and moves outwardly, engaging the generally horizontal plate 26 and forcing such plate outwardly into generally horizontal edge alignment with the vertical plate for welding. After completing the weld, the operator withdraws the screw for manual or other separation of the tool from the vertical plate as by breaking away of the temporary weld 28.

The illustrated tool with removal bracket is particularly adapted to the alignment of opposed plate-like members. The tool of the present invention can also be applied to the alignment of tubular members and the like, for example as shown in FIGS. 4 and 5.

In FIG. 5 a pair of opposed pipe members 30-31 are located in end-to-end relation. The adjacent end edges of pipes are provided with attachment flanges 32-33 having appropriate bolt openings 34 and adapted to receive interconnecting bolt members 35 when the openings are aligned. The level tool 1 is provided with a second adaptor bracket 36 particularly adapted to be coupled to pipe members 30-31 for aligning of pipe members. The special bracket 36 is shown including a flat mounting block 37 adapted to be bolted or otherwise releasably secured to the block or plate 10 of the L-shaped arm 6. An inverted generally V-shaped attachment channel 38 is welded or otherwise affixed to the underside of the bracket mounting block 37. The channel 38 is secured with the exterior apex adjacent the mounting block 37 and with the opposite arms or side plates projecting downwardly and outwardly. The V-shaped bracket is mounted with the apex extending in the plane of the L-shaped arm. A coupling channel 39 also of V-shape is adapted to be bolted with the channel 38 to and adapt to the diameter of pipe 30-31.

The level tool 1 is mounted with the side plates of the channel 39 engaging spaced portions of the pipe 30. One edge of the V-shaped member 39 is welded as by weld 40 to the pipe. With the channel 40 welded in place and interconnected to the L-shaped arm 6, the operating screw 8 is located in overlying operative relation to the offset opposed pipe 31. Inward movement of the screw 8 creates a mechanical deflection force on the offset pipe and deflects the pipe downwardly into the desired alignment for convenient interconnection of the pipe sections. The screw 8 is then withdrawn outwardly of the flanges. The tool 1 is conveniently removed by twisting of the tool 1 across the line of the temporary weld 40 to break the weld along the line of the weld for convenient and ready removal of the tool.

As previously noted, the present invention is adapted to include a substantial plurality of any desired replaceable adaptor brackets. For example, a V-shaped adaptor may be provided to develop a generally C-shaped clamp with the bracket arm offset from alignment with the working element of the generally L-shaped arm. The offset arm could of course be affixed to one plate member so as to align the working element with the other plate member. These and other configurations can be provided within the teaching of the invention wherein the plurality of adaptor brackets are releasably affixed to the working arm having the mounting block and the offset working member. Further, without any adaptor the mounting block on the L-shaped arm permits direct clamping to a table or other flat surface for use as a clamp unit.

The adaptor brackets may be and are preferably formed so as to permit reuse of each bracket for a significant member of times. However, the adaptors are readily formed of standard materials and may be relatively inexpensive so as to permit a single or only a few uses if so desired. Further, in any given application, the operator may of course custom design a fixture to be releasably mounted and temporarily welded in place.

Various modes of carrying out the invention are contemplated as being within the scope of the following claims, particularly pointing out and distinctly claiming the subject matter which is regarded as the invention.

I claim:

1. A level clamp apparatus for deflecting at least one of a pair of work members to product edge-to-edge alignment, comprising
   an adaptor means having a support element adapted to be secured to one of said work members and having a plurality of working engaging members, said adaptor means having an outer mounting means secured to said support element,
   a generally L-shaped member having intersecting first and second arms and a mounting means on the first arm complementing said adapter outer mounting means, and releasable attachment means for releasably interconnecting said mounting means to releasably affix said L-shaped member on said adaptor means for orienting of said L-shaped member and said support element with respect to said work members and
   an adjustable forcing member secured to the outer end of said second arm of said L-shaped member and movable therethrough for engaging of the second of said work member.

2. The level clamp apparatus of claim 1 wherein said adaptor means is an L-shaped channel having intersecting legs defining said working engaging members and adapted to be welded to a first of the work members, said L-shaped channel being adapted to be secured with the edges abutting the work member or with a leg abutting the work member so as to position the forcing member into alignment with the second of the work members.

3. The level clamp apparatus of claim 2 wherein each of said arms of said L-shaped member includes similar attachment openings for receiving said attachment means.

4. The clamp apparatus of claim 1 wherein said adaptor means includes a mounting block and a V-shaped working engaging member secured to the outer side of the mounting block.

5. The clamp apparatus of claim 4 wherein a V-shaped attachment member is affixed to said mounting block to receive different V-shaped work engaging members, and means for releasably attaching the V-shaped work engaging members to said V-shaped attachment member.

6. A level clamp apparatus for deflecting of one metal member relative to a second metal member, comprising
   a working unit having a work moving member adapted to engage said one metal member and having an offset mounting base member, and
   a mounting adaptor having a plurality of interconnected working engaging metal elements adapted to be located in selectively engagement with said second metal member and to be tacked welded to said second metal member, said adaptor having a releasable mounting means adapted to releasably secure either one of said metal elements to said working unit in a plurality of different orientations whereby said working engaging metal elements are differently oriented with respect to said work moving member.

7. A level clamp apparatus for deflecting of one metal member relative to a second metal member, comprising
   an L-shaped working unit having a work moving member adapted to engage a first of said metal members and having an offset mounting base member,
   an L-shaped mounting adaptor having first and second working engaging metal legs adapted to be located selectively engaging said second metal member and to be tacked welded to said second metal member, said L-shaped adaptor having a mounting surface complementing said base member, a second mounting adaptor having a mounting surface complementing said base member and having a generally V-shaped working engaging metal member, and a common releasable mounting means adapted to releasably secure either one of said adaptors to said working unit whereby said working engaging metal elements are oriented with respect to said work moving member to align the work moving member with the first metal member.

* * * * *